United States Patent [19]

Duffy

[11] 3,899,071
[45] Aug. 12, 1975

[54] CONVEYOR BELT PROTECTIVE SYSTEM

[76] Inventor: Walter Roy Duffy, 1914 Howard St., Butte, Mont. 59701

[22] Filed: June 29, 1973

[21] Appl. No.: 374,944

[52] U.S. Cl. .............................. 198/232; 340/259
[51] Int. Cl. .......................................... B65g 43/02
[58] Field of Search ....... 198/232, 40; 340/256, 259

[56] References Cited
UNITED STATES PATENTS

| | | | |
|---|---|---|---|
| 3,289,076 | 11/1966 | Edis et al. .............................. | 324/52 |
| 3,602,360 | 8/1971 | Halbach et al. ....................... | 198/232 |
| 3,636,436 | 1/1972 | Kurauchi et al. ..................... | 198/232 |
| 3,651,506 | 3/1972 | Olaf et al. ............................. | 198/232 |
| 3,680,686 | 8/1972 | Ciesielski ............................. | 198/232 |
| 3,731,113 | 5/1973 | Lowe et al. ........................... | 198/232 |
| 3,742,477 | 6/1973 | Enabnit ................................ | 198/232 |

FOREIGN PATENTS OR APPLICATIONS

| | | | |
|---|---|---|---|
| 147,132 | 3/1961 | U.S.S.R. ............................... | 198/232 |
| 127,922 | 3/1959 | U.S.S.R. ............................... | 198/232 |

*Primary Examiner*—Evon C. Blunk
*Assistant Examiner*—Richard K. Thomson
*Attorney, Agent, or Firm*—Pennie & Edmonds

[57] ABSTRACT

A conveyor belt protective system comprising an endless conveyor belt having an electrically conductive wire therein extending the length of said belt and forming a closed current path, means spaced from said belt for inducing an electric current in said current path, means for detecting the electric current in said closed current path, and means electrically associated with said detecting means for indicating any interruption of electric current flow in said current path.

1 Claim, 3 Drawing Figures

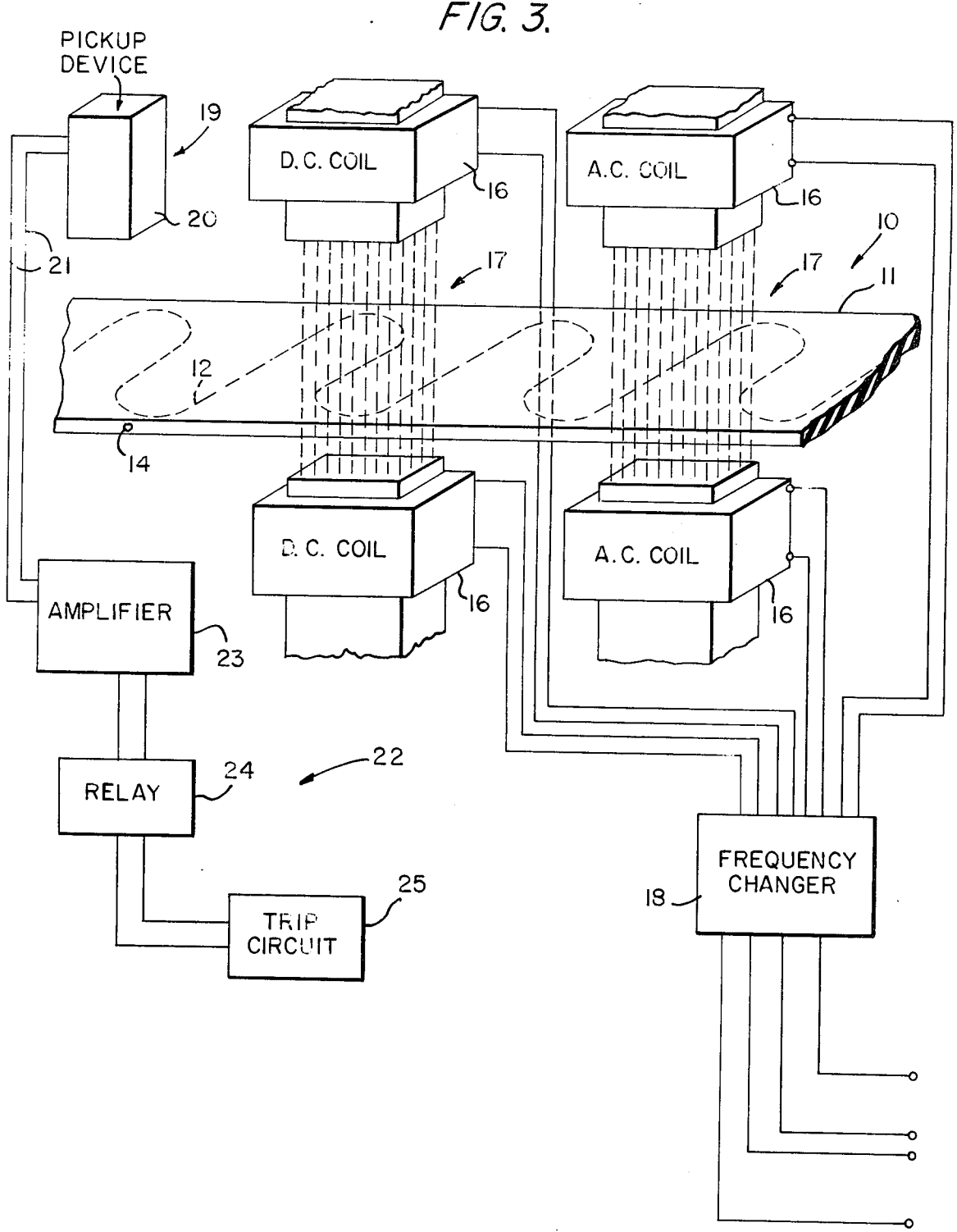

3,899,071

CONVEYOR BELT PROTECTIVE SYSTEM

BACKGROUND OF THE INVENTION

Endless belt conveyors are commonly used in many operations to convey a variety of materials from one location or apparatus to another. Belt life is dependent mainly upon the nature of the materials being conveyed and, in some operations, belt life is unduly short due to damage caused to the belt by objects being conveyed, which damage remains undetected until it becomes so severe that the belt cannot be repaired but must be replaced.

Damage of this type is particularly severe in mining operations where continuous conveyor belts are used to transport ores or tramp iron from one location to another. The ore fragments and tramp iron are often very sharp or have jagged, protruding edges which pierce the belt damaging it and, also, on occasion, becoming wedged against rolls or other means used to drive the belt. Thus, there is damage not only to the belt due to the cutting and piercing caused by the ores, but also damage to the means used to drive the conveyor. If undetected for any long period of time, such minor repairable tears and cuts become so severe under continued belt use as to render the belt unrepairable.

In an attempt to overcome this problem, detection devices, such as penetrating switches, have been tried but found unsatisfactory since they protect the conveyor belt only at the point where they are installed. No rapid, accurate system has been found which will minimize the problem of belt and conveyor damage.

SUMMARY OF THE INVENTION

The present invention provides a system for rapidly and accurately determining damage done to the belt to enable the early repair of same.

Briefly stated, the present invention comprises a conveyor belt protective system comprising an endless conveyor belt having an electrically conductive wire therein extending the length of said belt and forming a closed circuit path, means spaced from said belt for inducing an electric current in said current path, means for detecting the electric current in said current path, and means electrically associated with said detecting means for indicating any interruption of electric current flow in said current path.

DESCRIPTION OF THE DRAWINGS

FIG. 3 is a schematic view of an alternate embodiment of the invention wherein both D-C and A-C coils are used.

DETAILED DESCRIPTION

Figure 1:
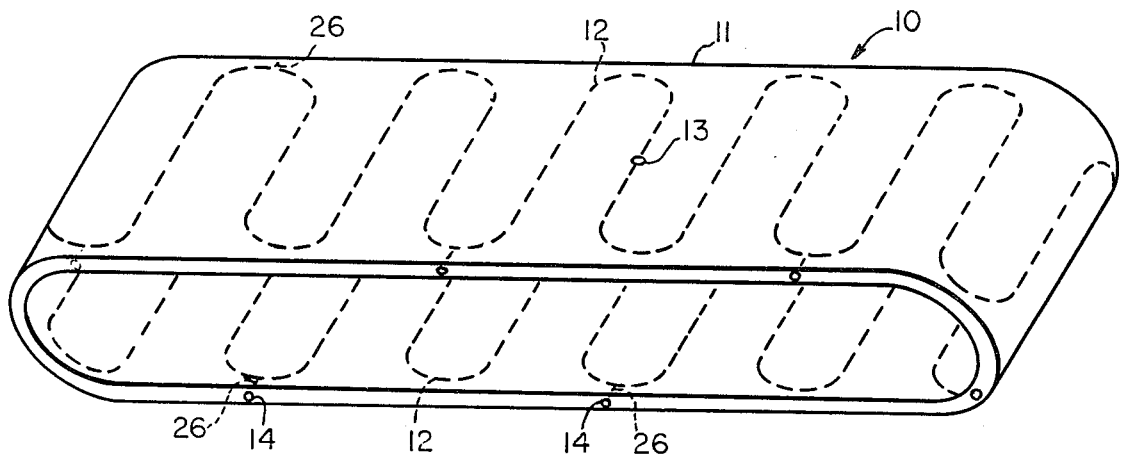
FIG. 1 is a perspective view of a conveyor belt showing in dotted outline an electrically conductive wire therein.
Figure 2:
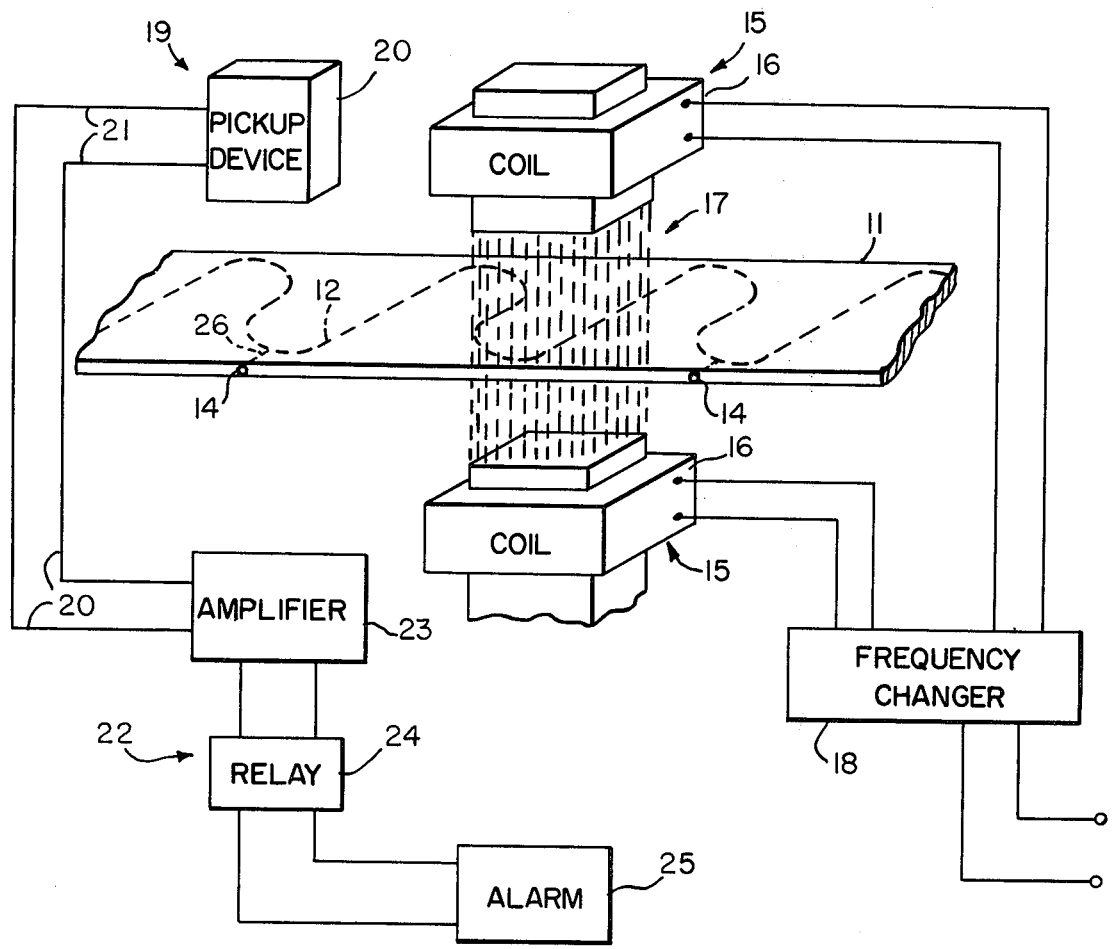
FIG. 2 is a schematic view of the invention with a portion only of the endless conveyor belt shown.

Referring to the drawings, there is shown an endless conveyor 10 comprising a belt 11 having therein an electrically conductive wire 12 extending the length of the belt 11. The wire 12, preferably of copper, is spaced so as to pass over large areas of belt 11. Preferably, the wire 12 is spaced in a continuous sinusoidal fashion so as to extend at right angles to the belt length for the entire length of the belt 11 so as to form a closed circuit. Although the spacing of the wiring 12 can be varied dependent upon the speed of the belt 11 and the amount of belt protection that is desired, it will be evident that the closer the spacing between the turns of wire, the more accurate will be the detection of any breaks as hereinafter described.

The wire 12 can be embedded in the belt 11 if, for example, the belt 11 is formed of a plastic material such as rubber. If the belt 11 is formed of laminated sheets, the wire 12 may be applied between the sheets prior to lamination. For purposes of illustration, the juncture 13 of the ends of the wire 12 has been shown indicating that a closed circuit or closed current path is found.

The belt 11 is driven about idler rolls by driving rolls (not shown) by the usual types of mechanical drive, also not shown. Such rolls and the means for driving the belt are those conventionally used and form no part of the instant invention.

Spaced from the belt 11 are means 15 for inducing an electric current in the closed current path. Means 15 comprises electromagnetic coils 16 which form a magnetic field 17 through which the belt 11 must pass. Such field 17 can be either an alternating or unidirectional magnetic field of sufficient strength so that, as belt 11, with the wire 12 therein, passes therethrough, a voltage will be induced in the conductive wire 12. Since the wire 12 is formed in a closed circuit, a current will flow in the path formed by the wire 12. The coils 16 are connected to an A-C or D-C voltage power supply (not shown) which supplies the proper voltage to electromagnetic coils 16. If a D-C voltage source and coils are used, a unidirectional electromagnetic field is formed, and the induced voltage in the wire will be sinusoidal in shape and have a frequency which will be proportional to the belt speed. It will be evident that A-C voltage and coils can also be used for the electromagnetic field. If desired, A-C voltages of higher frequencies other than synchronizing frequencies and sound energy in the VHF or UHF range can be used with combinations of unidirectional electromagnetic fields froom D-C sources and an alternating electromagnetic field from A-C sources can be used. Such combination is illustrated in FIG. 3.

A frequency changer 18 is used to synchronize the belt speed with the magnetic field to give a pulsating D-C voltage if desired. It is not necessary to utilize such frequency changer 18.

Means 19 for detecting the current in the conductive wire 12 comprises a pickup device or coil 20 located in close proximity of belt 11. Pickup coil 20 can be either frequency sensitive or can be activated by means of induced voltage to continuously monitor the continuity of current passing through the conductive wire 12 (closed current path). The output 21 of pickup coil 20 is connected to indicating means 22 comprising amplifier 23 where such output is amplified and, in turn, passed on to a relay 24 and to an alarm 25. Alarm 25, when actuated, can be of the type which emits a sound signal, light signal, or a combination thereof, or may be a trip circuit having a switch which stops operation of the conveyor 10. The detecting means 19 and indicating means 22 are operated so that, if there is an interruption of electric current flow in the closed current path, the alarm 25 will be activated either signaling that the interruption has occurred or shutting down the conveyor 10.

In order to further indicate the precise area of the break in the wire 12 causing the interruption should the tear in the belt be a minor one and not readily visible, a series of conventional electrical taps 14 connected by wires 26 to the conductive wire 12 are spaced about the belt 11, preferably in the edge thereof. One need only insert a usual circuit-testing device between any two of the taps 14 to determine the continuity and integrity of the conductive wire 12 between those two points. In this manner, the precise point of any break in the conductive wire 12 can be speedily located and repaired.

It will be evident from the foregoing description that the essential elements of the invention are the closed current path formed by the conductive wire 12 in the belt 11 and means 15 for inducing a current flow in the wire coupled with means 19 for detecting any interruption in current flow in the wire 12 as indicative of a break in wire 12 and, consequently, a possible tear or other damage to belt 11. The A-C and D-C coils 16, frequency changer 18, pickup coil 20, amplifier 23, relay 24, and alarm 25 used in the present invention can be any conventionally available components, and they are operatively connected to each other as described above by conventional electrical wiring.

The operation of the system is largely evident from the description that has been given. In operation, as belt 11 is being used to convey material, such as ore, it will be continuously passing through the magnetic field 17 produced by the coils 16. This field 17, in turn, will be continuously inducing a current in wire 12 in the conveyor belt 11. At the same time, the pickup coil 20 will be continuously monitoring belt 11 and will also be indicating whether a current is flowing in wire 12. The circuit connection from the pickup coil 20 through amplifier 23 and relay 24 is such that, when there is no electric current flowing in the wire 12, alarm 25 will be activated. Thus, if some of the ore should pierce the belt 11 and break the wire 12, there will be immediate notification of this fact permitting prompt stopping of the conveyor system 10 to permit repairs to the belt 11. As discussed above, the closer the wires 11 are spaced together in the preferred sinuisodal formation in the belt 11, the more sensitive the system will be to any break or puncture of belt 11.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. A system for monitoring the condition of conveyor belts comprising a conveyor belt adapted to be supported by a pair of spaced roller means and driven in endless path, an elongated conductor in said belt, said conductor disposed in said belt in substantially a sinusoidal pattern laterally of and extending along the length of the belt to form a closed current path, a pair of megnetically coupled coils positioned adjacent said conveyor belt for providing a magnetic field through which said conveyor belt passes to induce an electric current in said closed current path, detecting means disposed adjacent said conveyor belt, said detecting means responsive to the condition of said conveyor belt and capable of producing an output when said condition changes, circuit means including amplifier means for amplifying an output from said detecting means, relay means and an alarm, said circuit means connected to said detecting means for signalling the occurrence of said output, and a plurality of taps disposed in the edge of said conveyor belt, each said tap including a conductor in electrical contact with said elongated conductor to monitor continuity along said electrical path.

* * * * *